Patented Apr. 3, 1923.

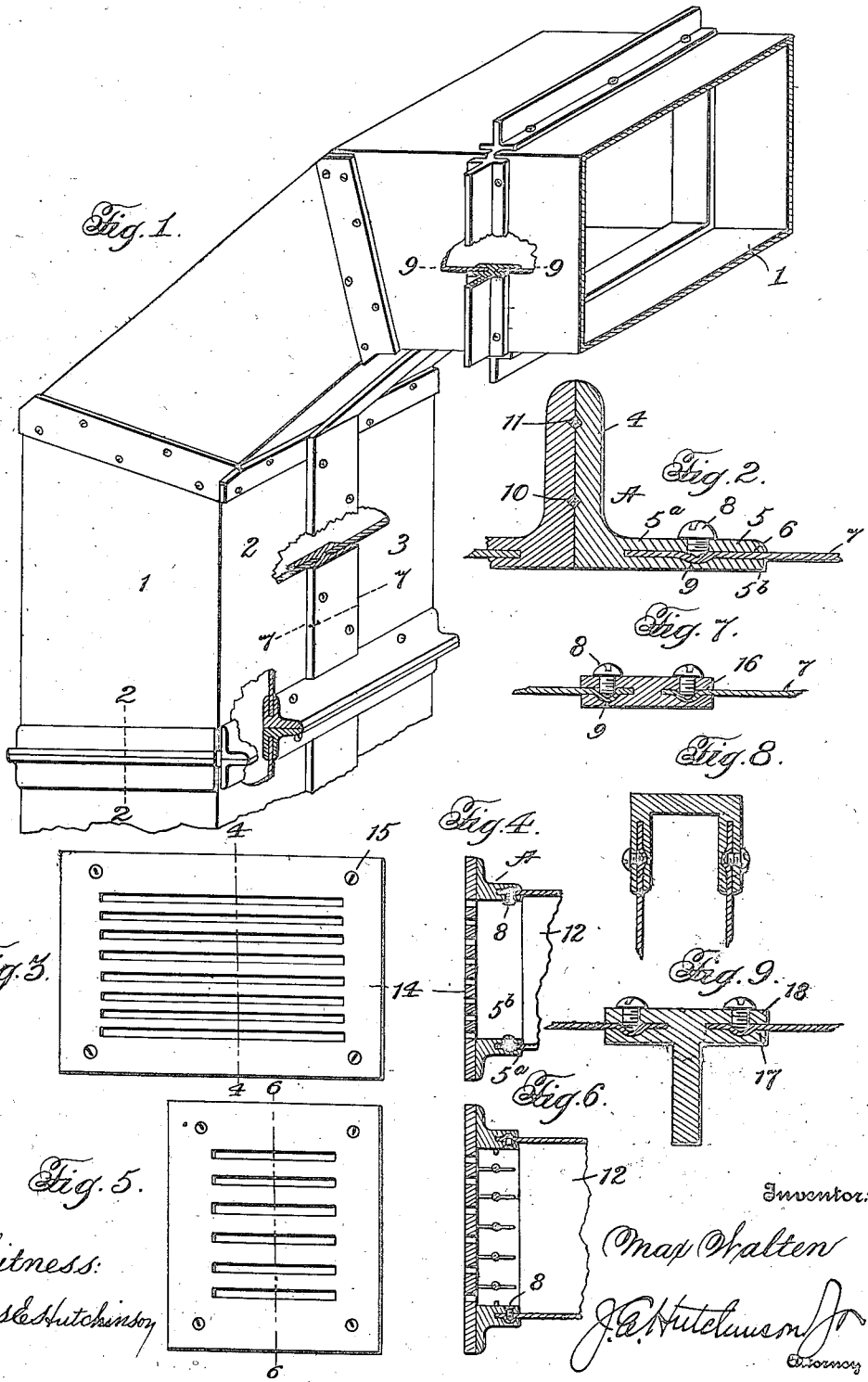

1,450,826

UNITED STATES PATENT OFFICE.

MAX WALTEN, OF WASHINGTON, DISTRICT OF COLUMBIA.

COUPLING DEVICE.

Application filed February 28, 1922. Serial No. 539,866.

*To all whom it may concern:*

Be it known that I, MAX WALTEN, a citizen of the United States, residing at Washington, D. C., have invented certain new and useful Improvements in Coupling Devices, of which the following is a specification, reference being had therein to the accompanying drawing.

This invention relates to coupling devices and while particularly adapted to connect rectangular sections of pipe in air lines, it lends itself admirably to many other purposes.

One of the objects of the invention is to provide a device by which rectangular sections of pipe may be joined in an expeditious manner with or without the employment of rivets.

Heretofore, in order to join rectangular sections of pipe it was necessary, or common practice, to rivet to each side of the pipe, at the end, a section of angle iron and then join the respective pieces of angle iron on the ends of the pipe sections, usually by riveting. This made the connection very difficult by reason of the fact that it was necessary to reach, the length of the pipe section, on the inside and apply, and hold the rivets with a dolly bar while they were headed up. Again in applying register mountings to rectangular outlet flues, riveting the angle irons, was a very difficult job and could only be accomplished at the expense of considerable time with expert labor, and then never with the assurance that the face of the mounting would be flush with the plaster.

With the present invention all the above difficulties are eliminated, and I am enabled to make rapid and efficient connection of the parts without the employment of skilled labor. For instance, in register mountings the angle irons may be attached permanently to the outlet flue in a very short period of time compared with the old method and with the aid of a single tool, a screw driver. Furthermore, I may build up sections of the required length and cross sectional dimensions and shape upon the job without the employment of expert labor and with the expenditure of comparatively little time.

Further objects of the invention will be apparent to those versed in the art as the following specification is read in connection with the accompanying drawing which forms a part of this application, and in which Figure 1 is a perspective view of an air duct which may be used in ventilating or heating systems and which discloses several types of coupling device for connecting the several sections of the duct.

Figure 2 is a section taken on the line 2—2 of Figure 1 and illustrated on a somewhat enlarged scale.

Figure 3 is a face view of the finishing plate of a ventilating or heating register.

Figure 4 is a section on the line 4—4 of Figure 3.

Figure 5 is a front view of a register employed in heating systems.

Figure 6 is a section on the line 6—6 of Figure 5.

Figure 7 is a horizontal section taken on the line 7—7 of Figure 1.

Figure 8 is a sectional view showing the invention applied to a channel type of connector which is employed in instances where parallel side walls are to be utilized for the purpose of containing insulation or the like.

Figure 9 is a horizontal sectional view on the line 9—9 of Figure 1.

Referring more particularly to the drawing, 1 represents a rectangular air duct which may be employed either in ventilating or heating systems, and as shown the vertical portion thereof is constructed of the separate halfs 2 and 3, joined together by a central coupling member to be hereinafter described. The vertical section of the pipe is in two parts which are joined together by the coupling members illustrated in section in Figure 2, each of which comprise a strip of angle iron of suitable dimension depending largely upon the size of the duct and the gage of the metal of which it is composed. Each angle iron indicated generally at A consists of right angularly disposed legs 4 and 5, the latter of which is longitudinally slotted as indicated at 6, which slot lies in a plane parallel with the upper and lower surfaces of the leg, thus forming a sheet or plate receiving kerf adapted to receive one end edge or wall of the sheet metal duct, this part being indicated at 7 in Figure 2. When the sheet or plate 7 is fitted into the kerf it is retained in place therein, parallel to the plane of the leg 5 by means of a set screw 8 which is threaded into an opening formed in the upper part $5^a$ of the leg. The lower part $5^b$ of the leg is provided with a recess or depression 9 into which a portion of the plate 7 is forced by the set screw 8.

The section disclosed in Fig. 2 shows a pair of coupling members butted together to join independent sections of the air duct. These separate coupling members when joined to opposite walls of adjoining duct sections may be connected together in any suitable manner such as by rivets or bolts passing through the legs 4, or these legs may be spot-welded together if found desirable.

Where tight joints between the respective duct sections are required I preferably groove the abutting faces of the legs 4 as shown at 10 and insert in such grooves packing strips 11 of asbestos, lead wool or other suitable material, so as to prevent leakage at the joint.

In Figures 3 to 6 I have shown the method of employing the type of coupling member illustrated in section in Figure 2 to form a support for register face plates and for a valved register. I have indicated at 12 in Figures 4 and 6 a hot air or ventilating duct. To the ends of the walls of these ducts I have attached in the manner shown in Figure 2, coupling members A, in this instance, with the set screws 8 passing through the inner leg 5$^b$ and pressing the metal of the duct into recesses formed in the outer leg 5$^a$. The reversal of the position of the set screws of these figures from that disclosed in Figure 2 is adopted in order that the workmen may readily have access to the heads of the screws in setting them up or in removing them for changing the position of the coupling members upon the duct end.

In employing a coupling device of this character the respective parts thereof may be temporarily attached to the fixed air duct and then properly adjusted upon said duct after the plaster coating has been placed upon the wall so that the position of the coupling members may readily determine the position of the face plate 14 which is attached thereto by screws 15, thereby enabling the workmen to mount the face plate flush with the surface of the plaster coating of the wall, or so that the coupling members are flush with the wall and the face plate arranged to overlap the joint between the coupling and the wall if desired. The advantage gained can be readily seen when the present method of connecting register mounting to outlet flues is understood. In the old method the coupling pieces were secured in place on the sides of the pipe and allowed to remain until the plaster coating was placed upon the wall. If these coupling members then were projected beyond the plaster coating or were indented therein, it was necessary for the workmen to remove the coupling pieces. To do this it was necessary to cut the rivets and then if the pipe was too long to trim it down to the required length, after which the coupling pieces were secured in place in any possible way and usually in a very flimsy manner, as it was not possible for him to again rivet the coupling members to the pipe on account of the fact that no support could be placed between the coupling members and the flue opening in the wall.

With the use of the present device, if the pipe is too long the coupling pieces may be readily removed, the pipe trimmed and the coupling pieces replaced, the only work involved being the setting up of the screws. If the pipe is too short the coupling pieces may be adjusted outwardly and the screws set up.

In the modification shown in Figures 7, 8 and 9 different types of the coupling member are illustrated which may be utilized in many ways. In Figure 7 which is a section on the line 7—7 of Figure 1, a coupling device is disclosed which consists of a flat piece of metal having kerfs 16 in opposite marginal edges which lie preferably in a central plane between opposite sides of the strip and in a plane with one another. The set screws 8 employed in this type of coupling are threaded into one portion and press the metal of the plate 7 into the recesses 9 in a similar manner to the construction shown in Figure 2. This type of coupling is particularly adapted for connecting the vertical seams of sectional ducts and may be utilized very conveniently in building up sections of the required size at the place of installation, and particularly where it is necessary as in some instances, to make the pipe of reduced size to accommodate it to certain cramped positions in the building.

Figure 8 illustrates another form of coupling which may be employed advantageously where parallel walls are desirable, as in any construction where insulation is employed between the respective walls. Two of these coupling members may be connected together by rivets or bolts passing through the bridge or yoke portion or by spot welding if desirable.

The construction shown in Fig. 9 shows a T iron type which may be utilized in place of the coupling members shown in Figure 2 and provided with the kerfs 17 formed in the opposite portions of the head 18 of the T as shown. In this instance as in the construction shown in Figure 2 the set screws may be entered from either side.

Where in the specification I have used the words "connecting parts" I refer to the legs 4 and 5 of the angle iron type or to the opposite bifurcated ends of the construction shown in Fig. 7 or Fig. 9 or to the opposite legs of Figure 8 and I wish it to be so understood.

I claim:—

1. A sheet metal connecting device comprising connected parts one of which has parallel separated sides adapted to receive between them a sheet lying in a plane therewith, and a set screw threaded into one of said sides and adapted to bind said sheet against the other side whereby said sheet is removably held therebetween.

2. A sheet metal joining device for air ducts, comprising connected parts one of which is bifurcated to receive a metal sheet lying in a plane with said part, and a set screw threaded into one side of said bifurcated part and adapted to bind the metal sheet aginst the other side thereof whereby said sheet is removably held in said bifurcation.

In testimony whereof I affix my signature in the presence of two witnesses.

MAX WALTEN.

Witnesses:
  HELEN N. RAMSEY,
  ADINE M. HAMPTON.